United States Patent
Yoshida et al.

(10) Patent No.: US 6,333,013 B1
(45) Date of Patent: Dec. 25, 2001

(54) METHOD FOR PRODUCING AN ULTRA FINE SILICA POWDER

(75) Inventors: Akio Yoshida; Hideaki Nagasaka; Akira Kobayashi, all of Fukuoka (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/503,163

(22) Filed: Feb. 14, 2000

(30) Foreign Application Priority Data

Feb. 23, 1999 (JP) .................................................. 11-044508

(51) Int. Cl.⁷ ..................................................... C01B 33/12
(52) U.S. Cl. ............................................ 423/337; 423/335
(58) Field of Search ..................................... 423/335, 337, 423/336; 204/164

(56) References Cited

U.S. PATENT DOCUMENTS 3,642,453 * 2/1972 Chilton et al. ........................ 423/335

* cited by examiner

*Primary Examiner*—Stuart L. Hendrickson
(74) *Attorney, Agent, or Firm*—Oblon, Spivak, McClelland, Maier & Neustadt, P.C.

(57) ABSTRACT

A method for producing an ultra fine silica powder, which comprises subjecting a raw material mixture containing a silica powder, a reducing agent comprising a metal silicon powder and/or a carbon powder, and water, to heat treatment at a high temperature in a reducing atmosphere with an oxygen concentration of less than 1 wt % to generate a SiO-containing gas, immediately cooling said gas in an atmosphere containing oxygen, and collecting fine particles.

10 Claims, No Drawings

METHOD FOR PRODUCING AN ULTRA FINE SILICA POWDER

BACKGROUND OF THE INVENTION

1. Field of the Invention

The present invention relates to a method for producing a high purity ultra fine silica powder.

2. Discussion of Background

Heretofore, an ultra fine silica powder having a large specific surface area has been packed for e.g. rubbers and resins for reinforcement thereof. The ultra fine silica powder may, for example, be silica obtained by flame thermal decomposition of silicon tetrachloride (fumed silica) or precipitated silica made of sodium silicate solution (precipitated silica), and it has an extremely large specific surface area of a level of from 50 to 500 m$^2$/g.

However, the fumed silica is high-priced since an expensive silicon tetrachloride gas is employed as a raw material, and the precipitated silica has a low purity of a level of 95%, and its use is limited, although it is available at a relatively low cost. Further, these methods are not always adequate as a mass production process, and it has thereby been desired to develop a mass production process to produce a high purity ultra fine silica powder at a low cost.

Accordingly, as a production method by using a silica raw material of low price, a method of spraying a slurry of a silica raw material and an inflammable liquid into a flame (JP-A-10-297915) or a method of quenching vapor formed by heating a silica raw material at a temperature of at least the boiling point of the silica (JP-A-2-233515) may, for example, be proposed.

However, the technique as disclosed in JP-A-10-297915 is basically a melting process by a high temperature flame, and the average particle size of the obtained silica particles is a level of several $\mu$m, and does not reach the ultra fine powder level of submicron. On the other hand, since the method as disclosed in JP-A-2-233515, comprises a vapor phase reaction, ultra fine powder can be obtained. However, heat treatment at a temperature of at least the boiling point of the silica (2230° C.) is required, and accordingly, the product will be contaminated by impurities in the furnace material and will have a low purity, or it may be necessary to employ an extremely expensive furnace material improper for an industrial process.

SUMMARY OF THE INVENTION

The present invention has been made under these circumstances, and it is an object of the present invention to provide a method for producing a high purity ultra fine silica powder, by heat treatment at a relatively low temperature by using a silica raw material for mass production.

Namely, the present invention provides a method for producing an ultra fine silica powder, which comprises subjecting a raw material mixture containing a silica powder, a reducing agent comprising a metal silicon powder and/or a carbon powder, and water, to heat treatment at a high temperature in a reducing atmosphere with an oxygen concentration of less than 1 wt % to generate a SiO-containing gas, immediately cooling said gas in an atmosphere containing oxygen, and collecting fine particles, wherein the raw material mixture is an aqueous slurry having a solid content concentration of from 20 to 60 wt %, and the heat treatment is carried out in a flame, and further, the cooling is a forced cooling by supplying a gas containing oxygen.

DETAILED DESCRIPTION OF THE PREFERRED EMBODIMENTS

Now, the present invention will be explained in further detail.

The type of the silica powder to be used in the present invention is not particularly limited, and a silica powder obtained by grinding silica stone is preferred in view of cost. The grain size is preferably from submicron to 100 $\mu$m, particularly preferably from 1 to 30 $\mu$m, since the production method of the present invention comprises a SiO gas generating reaction. Beyond this range, it is difficult to gasify coarse particles into SiO at a heat treatment temperature of the present invention. Further, with respect to fine particles, not only handling efficiency will deteriorate, but also the particles will aggregate to similarly impair SiO gasification. The purity is preferably as high as possible.

The present invention is characterized by using a raw material mixture containing both reducing agent comprising a metal silicon powder and/or a carbon powder, and water, blended with a silica powder. The SiO gasification may be inadequate by using only one of the reducing agent and the water, and no ultra fine silica powder may be produced. Here, the ultra fine powder is defined as a powder consisting mainly of submicron or smaller particles, having a specific surface area of at least 35 m$^2$/g, preferably at least 50 m$^2$/g, and having a content of coarse particles having sizes of at least 1 $\mu$m of not more than 5 wt %, preferably not more than 2 wt %.

It is not clean why a surprisingly ultra fine powder can be obtained even by heat treatment at a temperature of at most the boiling point of the silica, by employing both reducing agent and water as in the present invention. However, it is considered that due to the synergistic effect of the reducing agent and the water, the bonds of Si atoms and O atoms on the surface of the silica particles are weakened by water vapor, and then the reducing agent reacts therewith, whereby the gasification into SiO is significantly accelerated.

Further, the presence of the water not only increases the specific surface area, but also suppresses the reducing agent remaining.

The reducing agent to be used in the present invention comprises a metal silicon powder and/or a carbon powder. The higher the purity, the better, and a metal silicon is preferred in view of acceleration of SiO gasification due to reaction heat. Although the amount of the reducing agent depends upon the reaction temperature and may not be limited, approximately it is preferably from 0.25 to 4 mol, particularly preferably from 0.7 to 1.5 mol, per mol of the SiO$_2$ content in the silica powder.

The amount of the water is not particularly limited so long as the water content is at least 5 wt % in the mixture with the raw material silica powder and the reducing agent, although it should not be too high. Further, the water may be substituted by an alcohol such as ethanol in an amount of at most a level of 30 wt %.

The raw material mixture to be used in the present invention may be in the form of a slurry or a powder. In the case of a slurry, it will be easy to inject the droplets into a flame from a nozzle, whereby the productivity will further be increased. In such a case, as the slurry concentration, the solid content concentration is preferably from about 20 to about 60 wt %. If it is less than 20 wt %, the productivity will be low, and the amount of the heat of vaporization of the water will be large, whereby the gasification into SiO will be inhibited. Further, if it exceeds 60 wt %, it will be difficult to inject the droplets into a flame, and further, the gasification into SiO will be inhibited also. As a method of injecting the slurry, preferred is an air atomizing nozzle which can reduce the droplet size as much as possible, and particularly preferred is one having a structure which can reduce the droplet size to a level of several μm.

In the present invention, the raw material mixture is subjected to heat treatment at a high temperature in a reducing atmosphere with an oxygen concentration of less than 1 wt %, to generate a SiO-containing gas. The temperature for the heat treatment is preferably at least 1700° C., particularly preferably from 1800 to 2100° C. If the heat treatment temperature is significantly low, the gasification reaction into SiO will be inadequate. Although the upper limit of the heat treatment temperature is not particularly limited, if it exceeds the boiling point of the silica (2230° C.), the above-described inconvenience may be caused, and accordingly it is preferably at most 2230° C.

The site of high temperature in the heat treatment in the present invention may be obtained in e.g. an electric furnace or a combustion furnace by a flame, and a combustion furnace is preferred in view of e.g. mass productivity, easiness in adjustment of the atmosphere, and easiness in obtaining the local temperature distribution. The fuel gas may, for example, be hydrogen, LPG, natural gas, acetylene gas, propane gas or butane, and the supporting gas therefor may be the air or oxygen.

In the present invention, it is necessary to maintain the site of high temperature in the heat treatment be in to a reducing atmosphere with an oxygen concentration of less than 1 wt %, in order to accelerate the gasification of the silica powder into SiO. In the case of an electric furnace, it will be carried out by supplying a reducing gas such as hydrogen, a hydrocarbon or carbon monoxide into the furnace, and in the case of a combustion furnace, it will be carried out by controlling the proportion of the fuel gas to the supporting gas. Specifically, it will be carried out by supplying the supporting gas in an amount of a level of from 10 to 70% smaller than the theoretical value. It will be necessary to pay attention to carbon remaining in products, if the site of high temperature is in an extremely reducing state.

In the case of an electric furnace, the supply of the raw material mixture is preferably carried out by a continuous supply into the furnace kept to have a high temperature, in the same direction as the reducing gas flow or in the direction reverse thereof. In the case of a combustion furnace, the raw material mixture is injected into a flame in a reducing atmosphere. The injection is carried out by means of e.g. a spray atomizer such as an air atomizing nozzle, an ultrasonic nebulizer, or a rotating disc type atomizer and an air atomizing nozzle is most suitable in the view of mass productivity and acceleration of the gasification into SiO.

In the case of injection by an air atomizing nozzle, the raw material mixture is supplied preferably in the form of a slurry. Further, the structure of the nozzle is preferably such that the droplets formed by injection of the slurry are very small, and the nozzle is hardly be clogged. For example, the bore of the slurry injection tip aperture is preferably at least 2 mm, and the flow rate of the gas for the slurry injection at the nozzle tip is preferably at least 10 m/sec, particularly preferably from 100 to 400 m/sec.

As mentioned above, the SiO-containing gas is generated by the heat treatment of the raw material mixture, and in the present invention, said gas is immediately discharged from the site of high temperature, and cooled in an atmosphere containing oxygen. In the case of an electric furnace, the SiO-containing gas may be discharged by mixing with the reducing gas to be discharged, or by active suction. In the case of a combustion furnace, the SiO-containing gas is discharged by active suction as spherical particles in an usual flame spray unit are transported to the collecting system.

Then, the SiO-containing gas will be oxidized in an atmosphere containing oxygen, and SiO will be formed into fine silica particles and will be collected. This operation is carried out preferably by transporting the SiO-containing gas to the collecting system such as a bag filter by means of a gas containing oxygen such as the air, in both cases of an electric furnace and a combustion furnace. In this case, the average particle size and the specific surface area can be adjusted by the introduction position and the flow rate of the gas. Particularly in the case of a combustion furnace, the SiO-containing gas passed through the flame still has a high temperature of at least a level of 1600° C., and accordingly, it is preferred to forcibly cool said gas by supplying the gas containing oxygen from a part at slight distance from the end of the flame.

Now, the present invention will be described in further detail with reference to Examples. However, it should be understood that the present invention is by no means restricted to such specific Examples.

EXAMPLE 1

100 parts by weight of a mixed powder comprising a silica powder (average particle size: 2 μm, maximum particle size: 60 μm) and a metal silicon powder (average particle size: 10 μm maximum particle size: 100 μm) in such a ratio that the metal silicon powder was 0.8 mol per mol of the $SiO_2$ content in the silica powder, and 50 parts by weight of pure water, were mixed, and 10 kg thereof was put in a thin container and supplied to a pusher type electric furnace having its temperature kept to be 1700° C. by batch continuous system. Further, a hydrogen gas was introduced in the same direction as the supply of the raw material mixture, and the hydrogen gas and the generated gas were sucked from an exhaust hole provided at the upper side in the opposite direction by a blower, and further contacted with the air for cooling, and fine particles were collected by a bag filter.

The obtained fine particles constituted an ultra fine silica powder having a specific surface area of 70 $m^2/g$, a content of crude particle having sizes of at least 1 μm of less than 1 wt %, and a $SiO_2$ purity of 99.0 wt %.

EXAMPLE 2

An ultra fine silica powder was produced by using a combustion furnace which has the following structure. The combustion furnace is provided with a LPG-oxygen mixing type burner of double tube structure at the top of the furnace so as to form an inner flame and an outer flame, and the burner is further provided with an air atomizing nozzle for slurry injection at the center portion. A slurry and oxygen are injected to the flames from the center of the air atomizing nozzle and from the periphery thereof, respectively. The flames are formed by injection of LPG-oxygen mixed gases for the inner flame and for the outer flame from pores in the respective injection holes in the double tube structure burner, and their temperatures and atmospheres are adjusted by controlling the amounts of LPG and oxygen gas. The portion at which the flames are formed, is a reaction part, and is cut off from the contact with the air layer due to the formation of the flames. The side wall of the reaction part is protected by an alumina heat insulating material, and an air introducing pore is provided in the vicinity of the end of the reaction part for quenching oxidation of the generated gas. The product is transported to the collecting system by a blower, and collected by a bag filter.

A mixed powder comprising the same silica powder and silicon powder as used in Example 1, blended in an equimolar ratio, was put in pure water, to prepare a slurry having a slurry concentration of 50%. The slurry was injected into the flame in the combustion furnace from the center of the air atomizing nozzle (Model BNH160S-IS manufactured by Atomax) at a rate of 20 kg/h. For the injection, an oxygen gas was used with a gauge pressure of 0.3 MPa at a gas flow rate of about 12 $Nm^3$/h.

On the other hand, from the burner, for the inner flame, a mixed gas of LPG (6 $Nm^3$/h) and oxygen gas 12 $Nm^3$/h (corresponding to 40% to the complete combustion amount) was injected so as to cover the slurry injecting part with a reducing flame, and for the outer flame, a mixed gas of LPG (4 $Nm^3$/h) and oxygen gas (16 $Nm^3$/h) (corresponding to 80% to the complete combustion amount) was injected from the space in the outermost periphery of the burner, to cut the inner flame off from the outer air layer. The supply rate of the air from the air introducing pore was 400 $Nm^3$/h.

With respect to the collected powder, the specific surface area, the content of coarse particles having sizes of at least 1 μm by measuring particle size distribution, and the purity of $SiO_2$, were measured. Further, the temperature of the inner flame portion covering the injection part was measured by a thermocouple of W and Re at the center portion of the flame. Further, the reducing property of the inner flame portion was judged by measuring the oxygen concentration. The results are shown in Table 1 together with the production conditions.

EXAMPLES 3 TO 7
AND
COMPARATIVE EXAMPLES 1 AND 2

An ultra fine silica powder was produced in the same manner as in Example 2 except that the supply rate of LPG and the oxygen gas at the inner periphery of the burner, and the supply rate of the air from the air introducing pore were variously changed. In Comparative Example 2, the air was brought from part of the top of the furnace, to obtain an extremely oxidizing atmosphere. The results are shown in Table 1.

COMPARATIVE EXAMPLE 3

An ultra fine silica powder was produced in the same manner as in Example 2, except that the mixed powder of the silica powder and the silicon powder blended in an equimolar ratio, was supplied by means of a table feeder at a rate of 10 kg/h, instead of the raw material slurry used in Example 2. The results are shown in Table 1.

TABLE 1

|  | Inner Flame Temperature (° C.) | Oxygen conc. (wt %) | Cooling Air Supply Rate ($Nm^3$/h) | Specific Surface Area ($m^2$/g) | Coarse particles of at least 1 μm (wt %) | $SiO_2$ Purity (wt %) |
|---|---|---|---|---|---|---|
| Ex. 2 | 2000 | <1 | 400 | 130 | <1 | 99.6 |
| Ex. 3 | 1850 | <1 | 400 | 80 | <1 | 99.3 |
| Ex. 4 | 2200 | <1 | 400 | 150 | <1 | 99.0 |
| Ex. 5 | 1950 | <1 | 100 | 50 | <1 | 99.6 |
| Ex. 6 | 2000 | <1 | 200 | 80 | <1 | 99.4 |
| Ex. 7 | 1950 | <1 | 600 | 200 | <1 | 99.6 |
| Comp. Ex. 1 | 2000 | 1 | 400 | 50 | 7 | 99.3 |
| Comp. Ex. 2 | 1900 | 10 | 200 | 30 | 20 | 99.4 |
| Comp. Ex. 3 | 2000 | <1 | 400 | 30 | 10 | 98.5 |

As evident from Table 1, a high purity ultra fine silica powder was obtained in Examples 2 to 7 of the present invention, and from Examples 5 to 7, it was confirmed that the higher the cooling air supply rate, the larger the specific surface area of the high purity ultra fine silica powder. On the other hand, in Comparative Examples 1 and 2 wherein the inner flame portion was brought to be in an oxidizing atmosphere, and in Comparative Examples 3 wherein no water was present in the raw material mixture, the specific surface area was small, and a large quantity of coarse particles having sizes of at least 1 μm was formed.

EXAMPLES 8 TO 10
AND
COMPARATIVE EXAMPLE 4

An ultra fine silica powder was produced in the same manner as in Example 2, except that the ratio of the silica powder to the metal silicon powder or a carbon powder as the reducing agent was variously changed. The results are shown in Table 2.

EXAMPLE 11

An ultra fine silica powder was produced in the same manner as in Example 2, except that 20 wt % of the pure water was substituted by ethanol to prepare a slurry. The results are shown in Table 2.

EXAMPLE 12

An ultra fine silica powder was produced in the same manner as in Example 6, except that the ratio of the metal silicon powder was changed to 1.5 mol per mol of the silica powder. The results are shown in Table 2.

TABLE 2

|  | Reducing Agent | Amount of Reducing Agent per mol of Silica Powder (mol) | Specific Surface Area ($m^2$/g) | Coarse particles of at least 1 μm (wt %) | $SiO_2$ Purity (wt %) |
|---|---|---|---|---|---|
| Comp. Ex. 4 | Nil | 0 | 25 | 30 | 99.3 |
| Ex. 8 | Silicon | 0.53 | 90 | <1 | 99.6 |
| Ex. 9 | Silicon | 1.43 | 150 | <1 | 99.5 |
| Ex. 10 | Carbon | 0.55 | 60 | <1 | 99.1 |
| Ex. 11 | Silicon | 1.00 | 140 | <1 | 99.7 |
| Ex. 12 | Silicon | 1.50 | 35 | <1 | 99.5 |

As evident from Table 2, in Comparative Example 4 wherein no reducing agent was added, a large quantity of coarse particles having sizes of at least 1 μm was formed, and an ultra fine powder was obtained by using an appropriate amount of the reducing agent.

According to the present invention, an ultra fine silica powder having a high purity and a large specific surface area can easily be produced by subjecting a silica powder raw material to heat treatment even at a temperature lower than the boiling point of the silica (2230° C.), whereby mass production becomes possible.

What is claimed is:

1. A method for producing an ultra fine silica powder, which comprises subjecting a raw material mixture containing a silica powder, a reducing agent comprising a silicon powder and/or a carbon powder, and water, to heat treatment at a temperature sufficient for a gasification reaction into SiO, in a reducing atmosphere with an oxygen concentration of less than 1 wt % to generate a SiO-containing gas, immediately cooling said gas in an atmosphere containing oxygen, and collecting fine particles, wherein the ultra fine silica powder has a specific surface area of at least 35 $m^2$/g, and has a content of coarse particles having sizes of at least 1 μm of not more than 5 wt %.

2. The method according to claim 1, wherein the reducing agent comprises silicon powder.

3. The method according to claim 1, wherein the reducing agent comprises carbon powder.

4. The method for producing an ultra fine silica powder according to claim 1, wherein the ultra fine silica powder has a specific surface area of at least 50 m$^2$/g, and has a content of coarse particles having sizes of at least 1 μm of not more than 2 wt %.

5. The method according to claim 1, wherein the silica powder of the raw material mixture has a particle size of from submicron to 100 μm.

6. The method according to claim 5, wherein said particle size is from 1 to 30 μm.

7. A method for producing an ultra fine silica powder, which comprises subjecting a raw material mixture containing a silica powder, a reducing agent comprising a silicon powder and/or a carbon powder, and water, to heat treatment at a temperature sufficient for a gasification reaction into SiO, in a reducing atmosphere with an oxygen concentration of less than 1 wt % to generate a SiO-containing gas, immediately cooling said gas in an atmosphere containing oxygen, and collecting fine particles, wherein the ultra fine silica powder has a specific surface area of at least 35 m$^2$/g, and has a content of coarse particles having sizes of at least 1 μm of not more than 5 wt %, wherein the raw material mixture is an aqueous slurry having a solid content concentration of from 20 to 60 wt %, and the heat treatment is carried out by a flame.

8. The method for producing an ultra fine silica powder according to claim 7, wherein the raw material mixture comprises from 0.7 to 1.5 mol of the reducing agent per mol of the SiO$_2$ content in the silica powder.

9. The method for producing an ultra fine silica powder according to claim 7, wherein the raw material mixture comprises from 0.25 to 4 mol of the reducing agent per mol of the SiO$_2$ content in the silica powder.

10. The method for producing an ultra fine silica powder according to claim 9, wherein the cooling is effected by supplying a gas containing oxygen.

* * * * *